(12) United States Patent
Gresham

(10) Patent No.: US 6,507,579 B1
(45) Date of Patent: Jan. 14, 2003

(54) DIGITAL SWITCH RATE CONVERSION

(75) Inventor: Paul Gresham, Arnprior (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/344,064

(22) Filed: Jun. 25, 1999

(30) Foreign Application Priority Data

Jun. 29, 1998 (GB) .............................. 9814023

(51) Int. Cl.[7] .............................................. H04L 12/56
(52) U.S. Cl. .................. 370/358; 370/395.7; 370/412; 370/465
(58) Field of Search ................................. 370/358, 359, 370/395.7, 395.71, 395.72, 412, 413, 428, 429, 360, 362, 363, 364, 366, 368

(56) References Cited

U.S. PATENT DOCUMENTS

| | | | |
|---|---|---|---|
| 5,214,638 A | | 5/1993 | Norz et al. |
| 5,343,467 A | * | 8/1994 | Wohr .......................... 370/353 |
| 5,799,014 A | * | 8/1998 | Kozaki et al. ............... 370/358 |
| 5,867,677 A | * | 2/1999 | Tsukamoto ................... 370/358 |
| 5,953,258 A | * | 9/1999 | Thomann ..................... 365/149 |

FOREIGN PATENT DOCUMENTS

| | | |
|---|---|---|
| EP | 0206083 | 12/1986 |
| GB | 2084363 | 4/1992 |
| GB | 2318955 | 5/1998 |

* cited by examiner

Primary Examiner—Ricky Ngo
(74) Attorney, Agent, or Firm—Jones, Day, Reavis & Pogue

(57) ABSTRACT

A switching system for switching data with rate conversion between a high speed bus and a low speed bus, comprising a double-buffered data memory having a read-only port and a write-only port, a plurality of registers and selectors for receiving and storing successive frames of data from one of either the high speed bus or low speed bus into the data memory via one of the write-only port or said read-only port, respectively; and a connection memory containing a plurality of entries each having a first bit indicating channel ON/OFF status, an additional plurality of bits identifying connection addresses for the received frames of data; and a further plurality of index bits for addressing and reading the data memory via the other one of the write-only port or read-only port in the event the first bit is set and thereafter outputting the data to the other one of the high speed bus or low speed bus.

6 Claims, 4 Drawing Sheets

DIGITAL SWITCH RATE CONVERSION

FIELD OF THE INVENTION

This invention relates in general to telecommunications switching systems, and more particularly to a digital switch for use in a rate conversion application between a very high bandwidth bus and a comparatively low bandwidth bus.

BACKGROUND OF THE INVENTION

Traditional circuit switching systems utilize a data memory for buffering input signal data and a connection memory for selecting output signal data from within the data memory. Although prior art circuit switch architectures are adequate for "square" systems wherein the bandwidth of the input data stream approximates that of the output data stream, such systems become unwieldy where rate conversion is required between the input and output data streams.

Thus, for example, the input buffer required to ensure no signal loss in a system which converts data from a high speed data bus (such as the H.100 high-bandwidth bus which processes 4096 channels at 8 MHz), and a slower legacy bus architecture (such as the Mitel® ST-BUS standard which processes 256 channels at 2 MHz), would be 4096 bytes. Furthermore, in an application which supports a constant delay feature (i.e. double-buffered input), then the input memory size doubles to 8192 bytes of SRAM required to store the input data.

Using existing ASIC design techniques, it is estimated that the input data memory size required to implement a prior art digital switch with the above specifications would be as much as ¾ of the entire ASIC area.

With emerging high bandwidth communications systems, such as those designed according to the Open Telecom Platform (OTP) standard, it is contemplated that rate conversion switching architectures will be in increasing demand as businesses move to interface existing legacy PBX systems to such emerging high bandwidth systems.

SUMMARY OF THE INVENTION

According the present invention, a Peripheral Interface Application Specific Integrated Circuit (PASIC) is provided for performing digital switching of a plurality of serial links configured according to the H.100 generic high-bandwidth standard (H.100 is a standard issued by the ECTF (Enterprise Computer Telephony Forum—a telecommunications standards agency) and a further plurality of serial links configured according to the Mitel® ST-BUS, without requiring a large input buffer. Indeed, according to the present invention, a double-buffered input is provided using only 512 bytes of memory. The substantial reduction in memory buffer size results in significant savings in ASIC die size and cost, when compared to traditional digital switch designs.

Furthermore, according to the preferred embodiment, where a constant delay function is required, the delay buffer is placed in the output path rather than the input path, such that the size of the delay memory is reduced from approximately 4096 bytes according to the prior art, to 512 bytes.

BRIEF DESCRIPTION OF THE DRAWINGS

A detailed description of the preferred embodiment of the present invention is described herein below, with reference to the drawings in which.

DETAILED DESCRIPTION OF THE PREFERRED EMBODIMENT

As discussed above, the digital switch of the present invention is implemented as a PASIC device used in an OTP communications system. OTP represents a generic platform for the development of a wide range of telecommunications products encompassing both traditional PBXs and emerging convergent CTI systems. It provides generic services and capabilities, both hardware and software, for use as basic building blocks in specific product instances. Examples of software applications are voice mail and automated attendant, which may be invoked using APIs (Application Programming Interfaces), such as TAPI (Telephony Application Programming Interface). Hardware examples include primary power interconnects (e.g. AC mains or DC input), PSTN interfaces (e.g. LS/Class and T1), and on-premise interfaces (e.g. Digital Network Interface Card (DNIC), fiber, etc.)

Prior to describing the preferred embodiment of digital switch according to the present invention, a background description will be provided of the basic OTP network, node, and card models, followed by an overview of the OTP message routing and control functions which are inherent in the functionality of the digital switch of the present invention, as well as OTP messaging categories, structures, addressing, message transport and routing.

Figure 1:
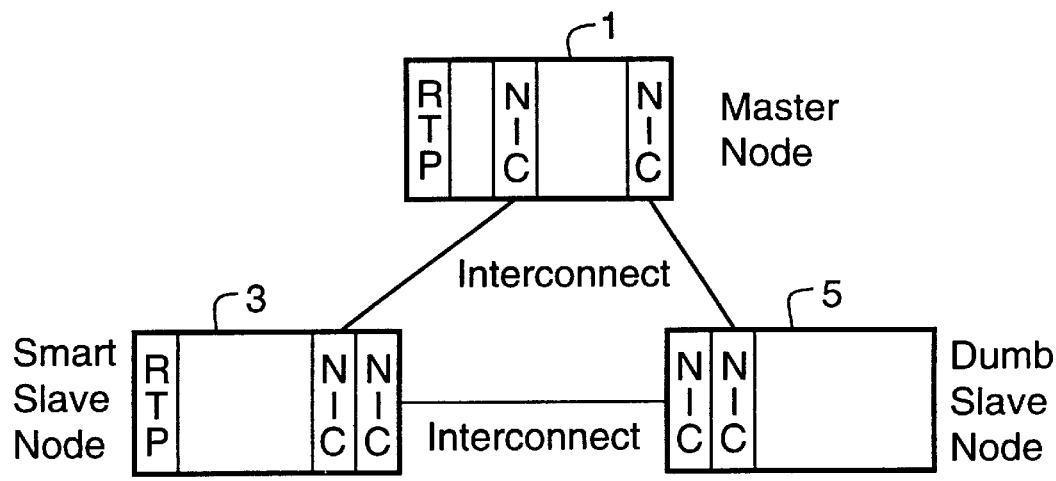
FIG. 1 is a block diagram of an OTP network reference model.

In an OTP system, a plurality of nodes may be interconnected, as shown in the representative model of FIG. 1. For simplicity, external interfaces (e.g. the PSTN) are not illustrated. A master node 1 may be connected to one or both of a smart slave node 3 or a dumb slave node 5. Each of the nodes includes a plurality of Node Interconnect Cards (NICs). The master node 1 and smart slave node 3 further include intelligence functionality in the form of a Real Time Processor (RTP). The interconnect media between nodes can consist of a single or multiple paths and, architecturally, may be realized as point-to-point connections or as paths provided via a network.

The master node 1 exerts fundamental responsibility for real-time telephony functionality within the system. This node is able to determine its responsibility by detecting one of either a full system program load (e.g. via a program card or flash memory), or a prime program download (e.g. by means of an Ethernet port connected to a remote system). In some embodiments the master node RTP will provide the sole processing function for the OTP system. In other embodiments, subordinate processing functions may be provided in other nodes, such as smart slave node 3, in which case the master node RTP establishes the operational parameters for the subordinate processing functions (e.g. via initialization and a subordinate download operation).

The smart slave node 3 provides at least one subordinate processing function via its RTP, for controlling its associated node. Other processors may be resident on the node for providing other system functions, but only one RTP assumes node control responsibility.

The dumb slave node 5 provides no node control processing functionality. Instead, its NIC acts as a proxy for a remote node controller (i.e. master node 1 or smart slave node 3). It will be appreciated that the dumb slave node 5 may incorporate processing resources, none of which provide a node control function.

Figure 2:
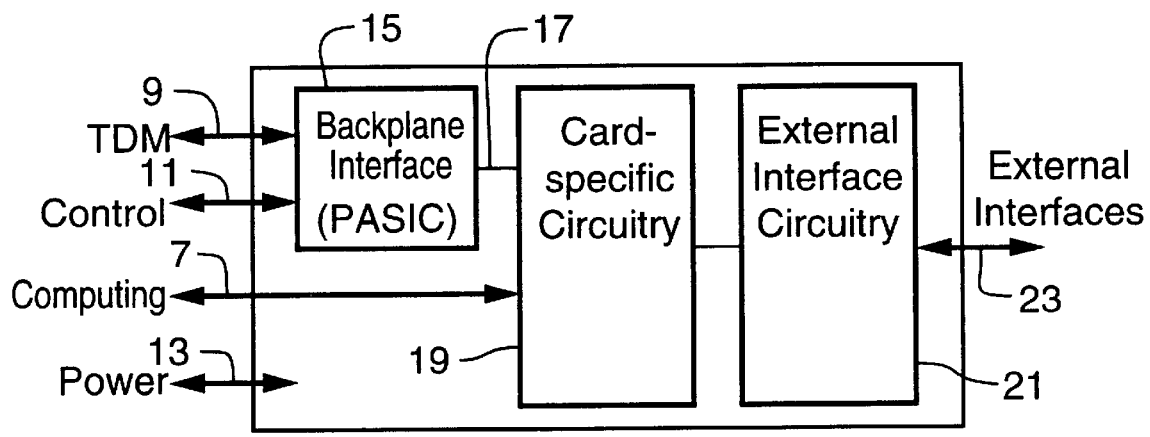
FIG. 2 is a simplified block diagram representing an OTP card including a PASIC device according to the present invention.

FIG. 2 shows a reference model for an OTP card capable of providing the NIC functionality discussed above. Where the node type is a so-called IT (Information Technology) node, a high-speed computing bus 7 is provided which, according to the preferred embodiment, is a Compact PCI (cPCI) 32/64-bit local bus. Both the IT node and telecom node include a high-bandwidth circuit switching TDM bus 9 which, according to the preferred embodiment, conforms to the H.100 structure of 32×8 Mbps links and a 2 Mbps CSMA/CD messaging channel. A control bus 11 provides a command and control path between the RTP and NIC cards in telecom nodes where there is no computing bus 7. Nonetheless, the control bus is provided for both IT nodes and telecom nodes. The control bus 11 is based on the H.100 standard for providing a single-wire bi-directional collision-based control signal (referred to herein as the message channel), card location identification and node identification. Finally, a power bus 13 is provided for introducing the required voltage rails in accordance with the H.100 standard and cPCI standard.

PASIC device 15 provides an interface for telecom-related support functions provided by the H.100 TDM busses 9 and a plurality of bi-directional serial links 17, which are configured according to the ST-BUS protocol. Additional functional and operational details of the PASIC device 15 are provided below.

Card-specific circuitry 19 provides the basic functionality of the OTP card, and may include computing or database functionality in an IT node, or call control or feature functionality in a telecom node. For telecom functions, the circuitry 19 communicates with the backplane PASIC interface 15 via ST links 17. Control signaling may derive from the computing bus 7, the H.100 message channel (via control bus 11), TDM bus 9, or a combination thereof.

The external interface circuitry 21 provides the functionality necessary to provide external interfaces 23, for the OTP card to the outside world. Some OTP cards require no connection to the outside world (e.g. DSP cards for tone detection, conferencing, etc.). Examples of common external interface circuitry include node interconnects (e.g. FIM), Local Area Network (e.g. Ethernet) as well as analog and digital telephony interfaces (e.g. ONS, LS/Class, DNIC, T1, etc.)

Figure 3:
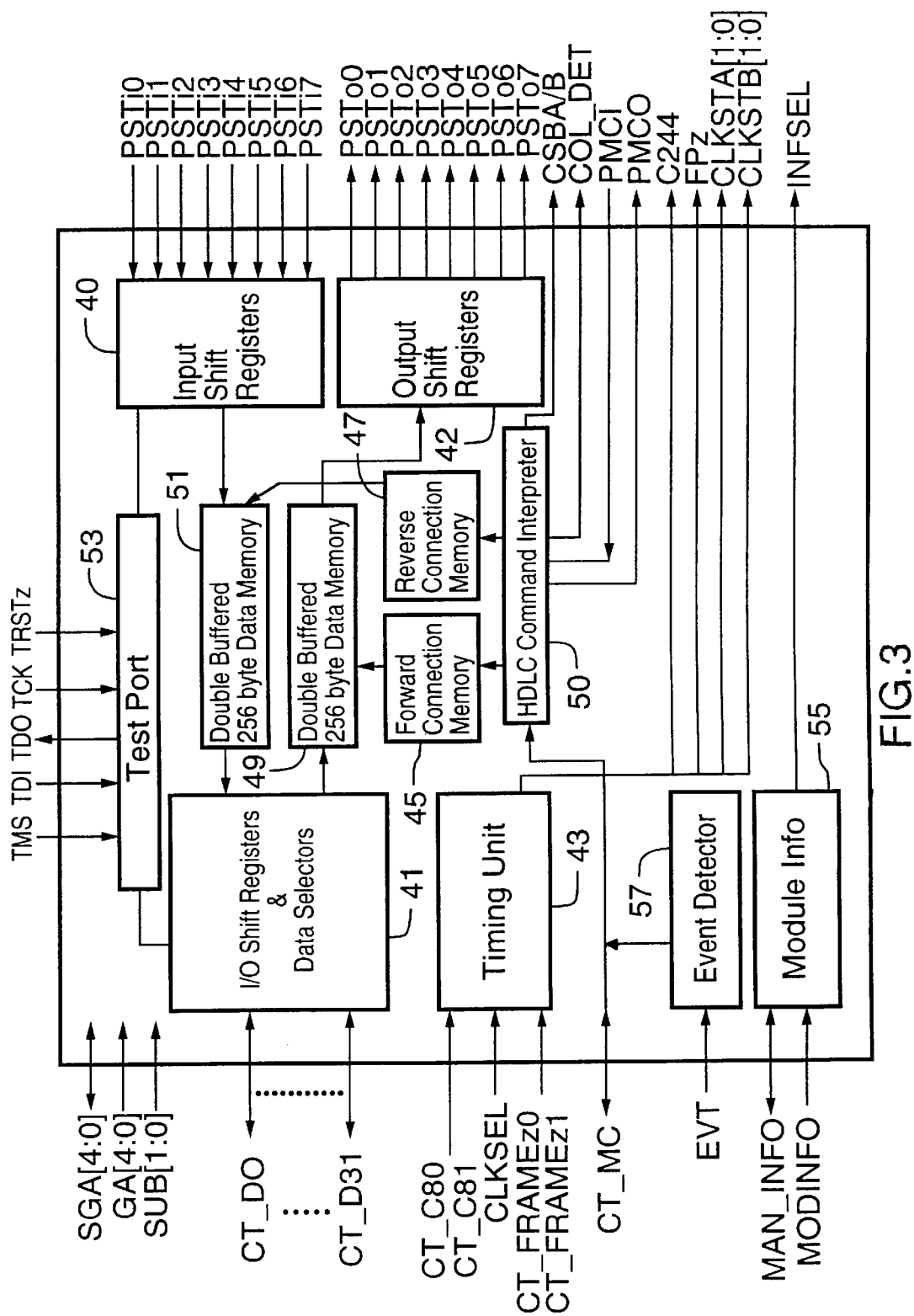
FIG. 3 is a block diagram of the PASIC device illustrated in FIG. 2, according to the preferred embodiment.

A block diagram of the PASIC device 15 is provided in FIG. 3. As discussed briefly above, the PASIC device is used to interface up to eight standard 2 MHz ST-BUS links 17 (FIG. 2) with thirty-two standard H.100 TDM data links 9. The H.100 TDM bus 9 comprises thirty-two circuits, identified as CT_D0 to CT_D31, which are terminated at a block of I/O shift registers and data selectors 41. The default operating speed of each circuit is 8 Mbits/s, resulting in 128 channel time-slots per circuit, with each time-slot being further divided into eight bits. Each CT_D circuit can act as both input and an output. The H.100 TDM bus 9 thus has a total switching capacity of 4096 channels.

The 2 MHz ST-BUS 17 contains eight input links (PSTi0–PSTi7) terminating at input shift registers 40 and eight output links (PSTo0–PSTo7) terminating at output shift registers 42. Each of the input and output ST-BUS links carries thirty-two channel time slots for a total of 8×32=256 channels.

Thus, as indicated briefly above and described in greater detail below, digital switching is performed from the 4096 channel H.100 TDM bus 9 to the 256 channel ST-BUS 17 without any requirement for a large input buffer.

A master clock signal (CT_C8x) marks the bit timing and a frame pulse signal, (CT_FRAMEx) is used to mark each frame boundary, by operation of a timing unit 43. More particularly, the master clock inputs are provided by the signal pairs (CT_C80, CT_FRAMEz0) and (CT_C81, CT_FRAMEz1), which correspond directly to the H.100 A and B clock sources, with the CLKSEL signal being used to select the clock source from one of the two clock pairs. Output signals CLKSTA[1:0] and CLKSTB[1:0], together, code the status of the input clock sources A and B, respectively.

Two internal 256-word connection memories 45 and 47 are provided. Forward connection memory 45 provides time domain switching information in respect of the H.100 circuits CT_D0 to CT_D31 from a first double buffered data memory 49, under control of HDLC command interpreter 50 to the 2 MHz ST-BUS output links PSTo0–PSTo7. Reverse connection memory 47 provides time domain switching information in respect of the 2 MHz ST-BUS input links PSTi0–PSTi7 from a second double buffered data memory 51, under control of HDLC command interpreter 50 to the H.100 circuits CT_D0 to CT_D31. Information in memories 49 and 51 is altered and monitored by command interpreter 50 using a command/response protocol.

A test port 53 is provided for JTAG test bus interface purposes, and does not form part of the present invention.

A module info circuit 55 receives a ST-BUS compatible input signal, MODINFO, for sourcing peripheral module information. The INFSEL signal indicates the start of a module information command, which is used to initialize loading and shifting hardware. MOD_ID represents an 8-bit bus used to return the card ID in response to a report module ID command. MAN-INFO represents a 1-wire serial EPROM, used to ID PROM contents in response to a REPORT-MAN_INFO command. None of these signals and circuit functionality is germane to the present invention.

As described in greater detail with reference to commonly-assigned application Ser. No. 05/343,227, entitled Method and Apparatus for Event Detection in a Switching System, an event detector 57 is provided for monitoring ST-BUS 17 for up to 256 status change indications.

Digital switch control for data being transmitted from the H.100 bus 9 to the ST-BUS 17 is effected using forward connection memory 45. Each entry in the 256-word connection memory corresponds to one channel of output. Each entry comprises twenty-one bits of data, as follows: twelve bits to indicate the desired input channel to be switched in; eight bits used as an index into the 256 byte data memory 49; and one bit to indicate channel ON/OFF status.

In one embodiment, the PASIC device 15 uses a further three bits within the connection memory 45, as follows: one bit to indicate per-channel message mode (similar to the per-channel message mode available in the MT8980 DX chip manufactured by Mitel Corporation-see Digital Switching/Network Components, Issue 10, Mitel Corporation, 1995, pp. 2–3); one bit to indicate per-channel data inversion (used for ease of interfacing between SX200® and SX200® switching systems manufactured by Mitel Corporation); and one bit to indicate equalized operation (similar to the equalized delay mode available in the MT8985 DX chip manufactured by Mitel Corporation—see Digital Switching/Network Components, Issue 10, Mitel Corporation, 1995, pp.2–45). These additional bits are not required for the functionality of the present invention, but provide convenient extensions of the inventive switching technique to legacy systems of Mitel Corporation.

Figure 4:
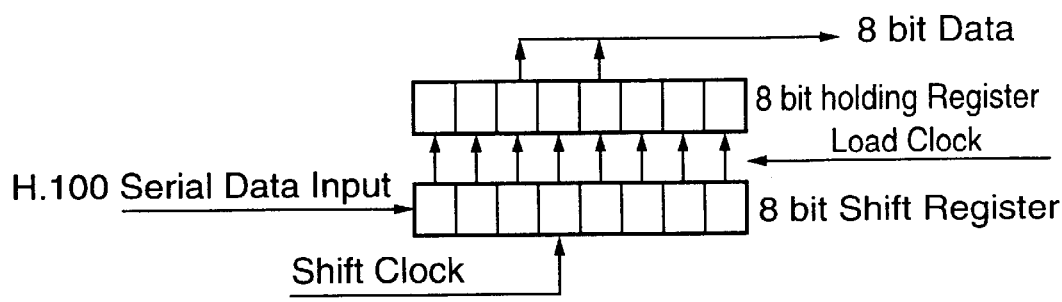
FIG. 4 is a schematic representation of one input shift register of the PASIC device illustrated in FIG. 3.
Figure 5:
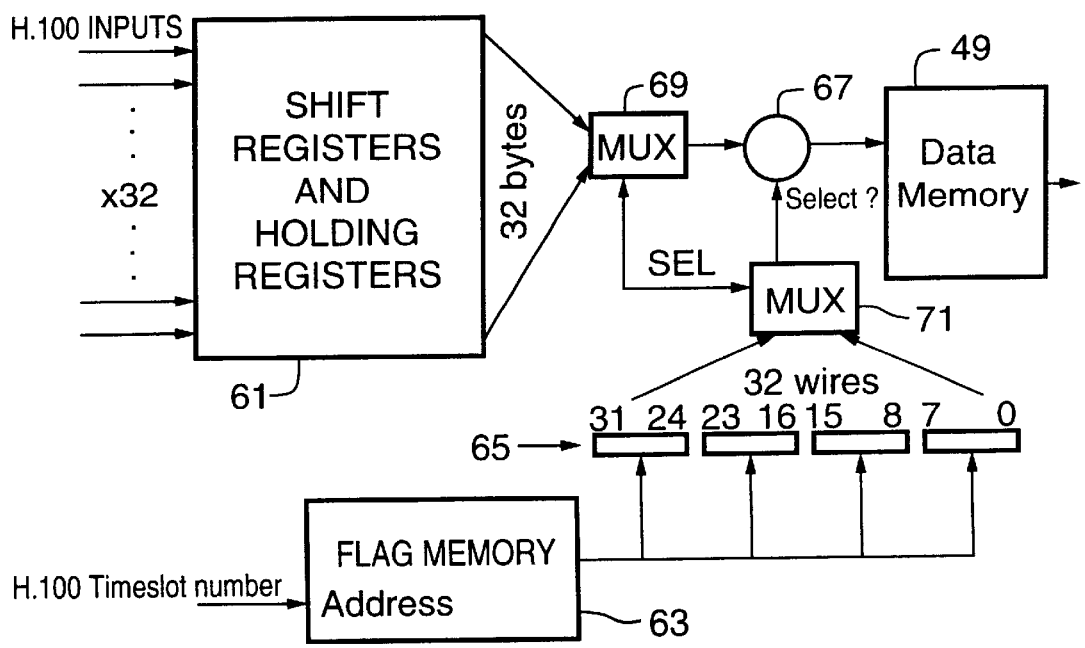
FIG. 5 is a schematic block diagram showing forward data flow through the PASIC device of FIG. 3.

During operation, with reference to FIGS. 4 and 5, the data on the H.100 data bus CT_D0 . . . CT_D31, is serially shifted into thirty-two eight-bit holding registers, once each channel time (i.e. 976 ns). FIG. 4 schematically illustrates the shifting of this data into one such register.

While the data is being shifted into the thirty-two input registers 61, four consecutive flag memory bytes are read from a flag memory 63 and stored in a thirty-two bit flag holding register 65. The flag memory 63 is organized into 512 words of eight bits each (although 256 words-by-16 bits, or 128 words-by-32 bits may be used as an alternative), for a total of 4096 bits. The thirty-two flag memory bits (i.e. four consecutive flag memory bytes read from memory 63) correspond to respective ones of the thirty-two H.100 circuits. On each channel boundary, thirty-two data bytes are available from the serial shift registers 61 and thirty-two flag bits are available from the flag memory 63 for processing.

A selector 67 examines every data byte and every corresponding flag bit presented to it via multiplexers 69 and 71, starting at data byte zero (i.e. CT_D0) and proceeding through to the last data byte (i.e. CT_D31). If the corresponding flag bit is set, then the data byte is copied into the next sequentially available memory location of data memory 49. If the flag bit is not set, then the data is not copied. Flag memory 63, holding register 65, multiplexers 69 and 71, and selector 67, in combination with registers 61, form the I/O shift registers and data selectors 41 depicted in FIG. 3.

Figure 6:
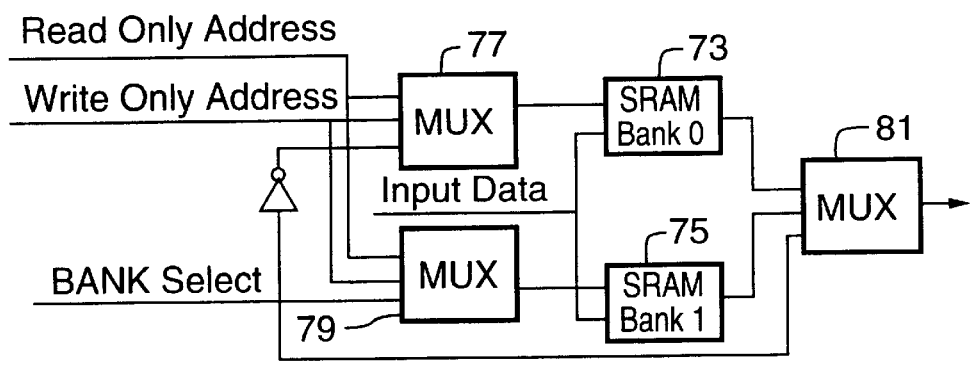
FIG. 6 is a block diagram of a double buffered data memory of the PASIC device illustrated in FIGS. 3 and 5.

The data memory 49 is divided into two memory banks 73 and 75, each connected to two input multiplexers 77 and 79 and an output multiplexer 81, as shown in FIG. 6. According to this configuration, the memory banks may be instantaneously swapped between a "write-only" port controlled by the flag memory 63 (discussed above), and a "read-only" port. On each frame boundary, the memory banks 73 and 75 are switched, such that the write-only port continually copies data from a single frame alternately into each memory bank, while the read-only port continually copies out data stored in the other memory bank.

The write-only port selects data sequentially from the H.100 bus 9 as it appears during a given frame, beginning with circuit 0 during time slot 0, to circuit 31 during time slot 127. The circuit numbers are counted as least significant (i.e. most rapidly changing) and the time slots are counted as most significant (i.e. least rapidly changing).

As indicated above, during the next frame, the read-only port gains access to all of the data stored by the write-only port during the previous frame. The read-only port supplies output data to the ST-BUS 17 over eight lines and thirty-two channels. During each ST-BUS channel time (i.e. each 3.904 $\mu$s), all eight ST-BUS data bytes are output by means of reading the corresponding locations of connection memory 45 for the eight-bit index and ON/OFF bit discussed above. If an ON/OFF bit is set, then the corresponding eight-bit index field is used to address the read-only port of data memory 49. The data at the indicated address is read from memory 49 and stored into the corresponding one of output shift registers 42 for the subject channel. If the ON/OFF flag is not set, then the ST-BUS 17 remains in a tri-state condition for the associated channel time.

Figure 7:
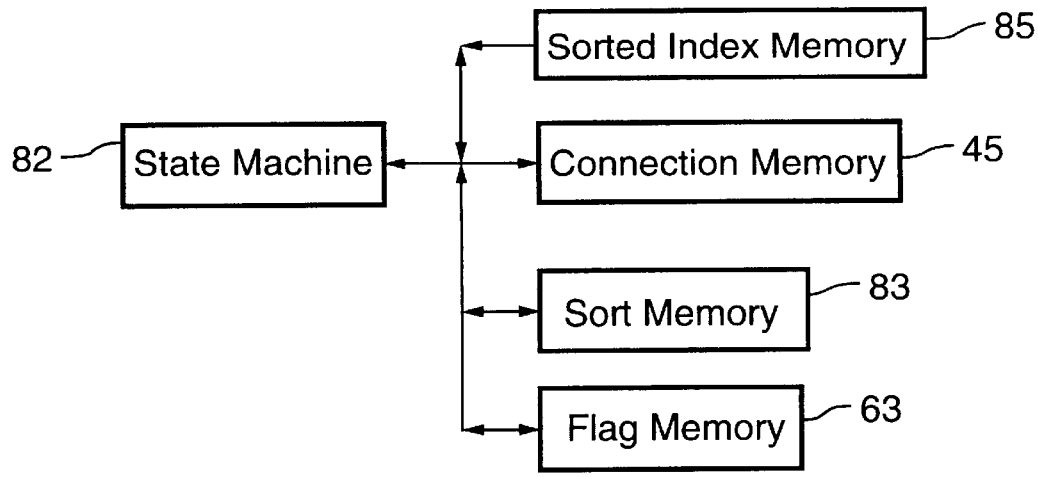
FIG. 7 is a block diagram showing an implementation of connection change hardware according to the preferred embodiment.

FIG. 7 shows the hardware utilized to correctly set all of the entries of flag memory 63 and to correctly set the eight-bit index field in each location of connection memory 45 whenever a new connection is established or an existing connection is torn down. A sequential state machine 82 performs all of the required data transactions between the memories 45 and 63, and a 256 address sort memory 83 which stores 12 bits to identify the H.100 connection address and 8 bits for each new index value. A sorted index memory 85 is also provided, as discussed in greater detail below. These components are invoked only during a connection state change of PASIC device 15, but not during steady state operation of the device. Consequently, these components are not illustrated in the block diagram of FIG. 3.

When a change in connection state is desired, the contents of the existing connection memory 45 are copied and stored in sort memory 83 starting at channel 0 and link 0, with the link numbers counted as least significant (i.e. most rapidly changing) and the channel numbers counted as most significant (i.e. least rapidly changing). Only enabled channels are copied. As the connection memory 45 is copied, the 8-bit new index field is initialized at zero and then incremented. Once the contents of connection memory 45 have been copied to sort memory 83, the H.100 addresses of all enabled channels are stored in the 12 bit location and the 8-bit new index field contains an incrementing pattern of values.

A "heap sort" algorithm is then used to sort the memory 83 according to the 12-bit H.100 addresses in ascending order, so as to determine the order in which the H.100 data is being stored in the data memory 49, and to transfer the determined order to the 8-bit index field in the connection memory 45. This "heap sort" algorithm is based on well-known techniques, as described for example, in "Data Structures and Program Design in Modula-2", Macmillan Publishing Company, N.Y., 1990, p.450. Although the use of a "heap sort" algorithm is advantageous because it eliminates the requirement for a re-entrant algorithm, the actual type of sort routine used is not critical to the switching technique of the present invention, nor are the details of its implementation in hardware. According to the preferred embodiment, all of the relevant variables were duplicated as hardware registers and the compare functions were synthesized.

During the sorting operation, the new index numbers are tagged with their corresponding 12-bit H.100 addresses so that when the sort is complete, the order of the new index numbers represents the order in which the switched data appears at the H.100 bus 9. However, if the 12-bit H.100 addresses contain a duplicate pattern (i.e. one that should come from the same location of data memory 49), then the new index numbers will be erroneous following the duplicate pattern. In order to overcome this difficulty, a sorted index memory 85 is provided (256 bytes). The sorted index memory 85 is cleared while the connection memory 45 is being copied to sort memory 83. After the heap sort has been completed, each sorted record is read in sequence, and the 8-bit new index field is used to address the sorted index memory 85. An incrementing data pattern is stored at these addresses, starting at address zero. Whenever a duplicate H.100 address entry is encountered, the data pattern that is in the process of being stored in the sorted index memory 85 is not incremented for that duplicate entry. Accordingly, the copy is complete once all sorted records have been accessed.

The sorted index memory 85 corresponds, on an entry-by-entry basis, to the original connection memory 45 and, therefore, to the data outputs to ST-BUS 17. Respective entries in the sorted index memory 85 contain 8-bit data for use as an index address into the 256-byte read-only port of the data memory 49 (FIG. 6).

The flag memory 63 and the 8-bit index information have to be updated with new information without disrupting data flow for the H.100 bus 9, through the double-buffered memory (FIG. 6) and out on the ST-BUS 17. Before the flag memory 63 and index field of the connection memory 45 are updated, the sort memory 83 is scanned and duplicate entries are removed. This can be done at the same time the sorted index memory 85 is set. It takes 1 frame each, to update the flag memory 63 and the index field in the connection memory 45.

Figure 8:
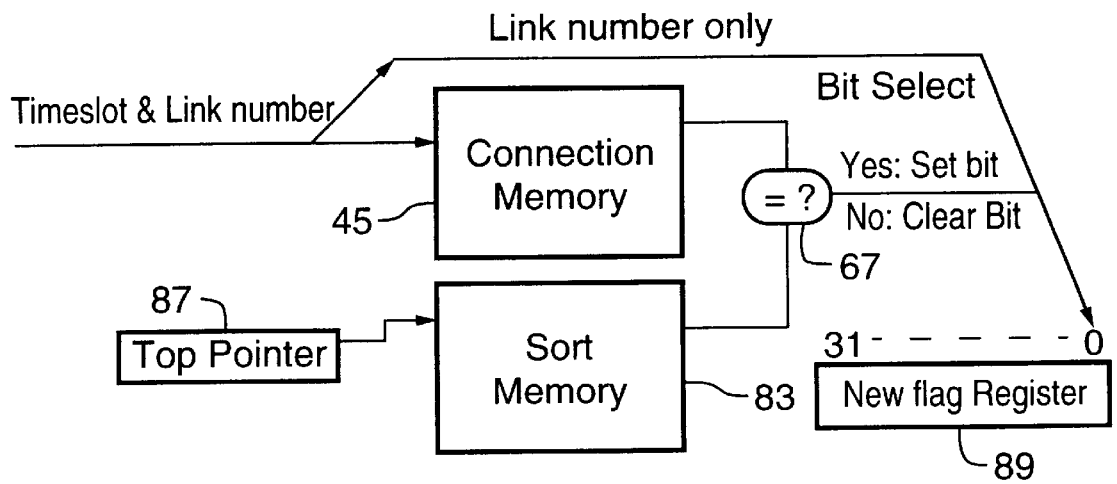
FIG. 8 is a block diagram showing an implementation of flag update hardware according to the preferred embodiment.

The flag memory 63 is updated first, at the start of the frame, while the flag memory 63 and connection memory 45 are being read for data flow during that frame. A top pointer (FIG. 8) is set to indicate the first entry in the sort memory 83. As each link of each channel is processed, the 12-bit H.100 address field in the connection memory 45 is examined by state machine 82 and compared to the 12-bit connection pattern in the top element of the sort memory 83. If a match occurs, then a corresponding bit in a new flag register 89 is set, and the value in top pointer 87 is incremented by one. The top pointer 87 starts at zero at the beginning of a frame, and is incremented each time a match is found, until all entries in the memory 83 have been used.

Each time a match is found, a corresponding bit in new flag register 89 is set. On the channel boundary, the new flag information in register 89 is re-written to the flag memory 63 at the original address. Accordingly, at the end of the frame time all of the flag memory 63 will have been updated and, starting with the next frame, the new flag data will be used to control the flow of H.100 data into the data memory 49.

Figure 9:
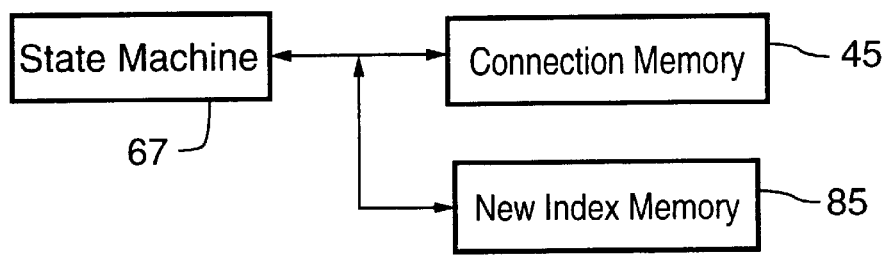
FIG. 9 is a block diagram showing an implementation of connection index field update hardware according to the preferred embodiment.

The connection memory 45 is updated in a similar manner on the frame following the frame during which the flag memory is updated. As shown in FIG. 9, the original index value in the connection memory 45 is used to read the current data from the data memory 49. Once this value has been used, the new index value is read from the sorted index memory 85 at the same address, and copied back to the connection memory 45. At the end of the frame, all connection memory index values will have been updated.

From the foregoing, it will be appreciated that the switching algorithm of the present invention results in ST-BUS data being output during the frame following that in which it was received, except for data switched to ST-BUS channel 0. This data appears on the ST-Bus during the second frame following its receipt. As indicated above, constant delay can be provided for all channels by adding a one-frame delay buffer on the ST-BUS output path, for all channel data except channel 0.

The detailed description refers to data flow from the H.100 TDM bus 9 to the ST-BUS serial links 17, via data memory 49 and output shift registers 42, through operation of forward connection memory 45. It will be appreciated by a person of ordinary skill in the art that exactly the same technique is used to control the flow of data from ST-BUS links 17 to H.100 TDM bus 9, via input shift registers 40 and data memory 51, under control of reverse connection memory 47 (with reversal of the two memory banks 73 and 75 so that "write" becomes "read", and vice versa, and reversal of the sequence in which the flag memory 63 and index field of connection memory 47 are updated).

Other variations and modifications are possible. For example, as discussed briefly above, an additional bit of connection memory 45 (or 47) may be used for other channel control functions, such as inverting, message-mode, and constant delay. The message-mode application could be used to alter the flow of data on a per-channel basis such that, instead of reading the data memory 49 to obtain ST-BUS output data, the least eight significant bits of the H. 100 address may be used as a static value. All such changes and modifications may be made without departing from the sphere and scope of the invention as defined by the claims appended hereto.

What is claimed is:

1. A switching system for switching data with rate conversion between a high speed bus and a low speed bus, comprising:
    a) a double buffered data memory having a read-only port and a write only port;
    b) a plurality of registers and selectors for receiving and storing successive bytes of data in a frame from one of said high speed bus and said low speed bus into said data memory via one of said write-only port and read-only port, respectively; and
    c) a connection memory containing a plurality of entries each having a first bit indicating whether a data byte has been copied to said data memory from one of said registers, an additional plurality of bits identifying connection addresses for said received bytes of data; and a further plurality of index bits for addressing and reading said data memory via the other of said one of said write-only port and said read-only port in the event said first bit is set and thereafter outputting addressed data bytes to the other one of said high-speed bus and low-speed bus.

2. A switching system for switching data with rate conversion between a high speed bus and a low speed bus, comprising:
    a double-buffered data memory having a read-only port and a write-only port;
    a plurality of registers and selectors for receiving and storing successive bytes of data from one of said high speed bus and said low speed bus into said data memory via one of said write-only port and said read-only port, respectively;
    a connection memory containing a plurality of entries each having a first bit indicating channel ON/OFF status, an additional plurality of bits identifying connection addresses for said received bytes of data; and a further plurality of index bits for addressing and reading said data memory via the other of said one of said write-only port and said read-only port in the event said first bit is set and thereafter outputting said data to the other one of said high speed bus and said low speed bus;
    a sort memory for storing said index bits and said additional plurality of bits identifying connection addresses for said received bytes of data; and
    a state machine for copying said additional plurality of bits of enabled channels represented in said connection memory to said sort memory according to an ascending order of said index bits in the event of a change in connection status, and thereafter sorting said sort memory according to an ascending order of said additional plurality of bits, such that upon completion of said sorting said index bits are ordered so as to correspond in order to said data received from said one of said high speed bus and said low speed bus.

3. The switching system of claim 2, further comprising a sorted index memory for storing an incrementing pattern of said index bits as stored in said sort memory excluding any ones of said index bits generated as a result of duplications in said additional plurality of bits identifying connection addresses for said received bytes of data.

4. The switching system of claim 3, further comprising a top pointer for accessing successive entries of said sort memory in ascending order in response to which said state machine compares said additional plurality of bits stored in said connection memory for identifying connection addresses for said received bytes of data with respective ones of said additional plurality of bits of enabled channels in said sort memory and in the event of a match therebetween setting a corresponding bit in a new flag register.

5. The switching system of claim 4, wherein said plurality of registers and selectors further comprises a flag memory for receiving data from said new flag register, a holding register for receiving a plurality of flag bits from said flag memory, whereupon said state machine copies individual data bytes into said data memory via said write-only port in the event that associated ones of said flag bits are set.

6. The switching system of claim 5, wherein said state machine subsequently updates said connection memory by replacing respective ones of said index bits with corresponding entries from said sorted index memory.

* * * * *